(12) United States Patent
Yonekura et al.

(10) Patent No.: US 11,962,640 B2
(45) Date of Patent: Apr. 16, 2024

(54) WRITE-IN-PLACE MULTIPART UPLOADS

(71) Applicant: EMC IP Holding Company LLC, Hopkinton, MA (US)

(72) Inventors: Takafumi Yonekura, Bellevue, WA (US); Jeffrey Tremaine, Kanagawa (JP)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 248 days.

(21) Appl. No.: 17/378,255

(22) Filed: Jul. 16, 2021

(65) Prior Publication Data
US 2023/0019437 A1    Jan. 19, 2023

(51) Int. Cl.
*G06F 16/13* (2019.01)
*G06F 16/11* (2019.01)
*H04L 67/06* (2022.01)

(52) U.S. Cl.
CPC .................................. *H04L 67/06* (2013.01)

(58) Field of Classification Search
None
See application file for complete search history.

(56) References Cited

U.S. PATENT DOCUMENTS

| 2014/0215152 A1* | 7/2014 | Cheng | H04N 21/2405 711/114 |
| 2014/0279846 A1* | 9/2014 | Srinivasan | G06Q 10/107 707/608 |
| 2018/0137181 A1* | 5/2018 | Abraham | G06F 16/2282 |
| 2019/0215358 A1* | 7/2019 | Kobayashi | H04L 67/06 |

* cited by examiner

*Primary Examiner* — Nicholas R Taylor
*Assistant Examiner* — Ho T Shiu
(74) *Attorney, Agent, or Firm* — Amin, Turocy & Watson, LLP

(57) ABSTRACT

A system can receive a file in parts. The system can write a first part to a first temporary file that corresponds to the first part's length at a first location of the first temporary file based on the its part number. The system can for a second part having a same length as the first part, write the second part to the first temporary file at a second location of the first temporary file based on its part number. The system can, in response to receiving a third part that has a different length than the first part, write the third part to a second temporary file at a third location of the second temporary file based on its part number. The system can, after receiving the parts, write data of the second temporary file to an end of the first temporary file, and rename the temporary file.

20 Claims, 15 Drawing Sheets

WRITE-IN-PLACE MULTIPART UPLOADS

BACKGROUND

Multipart (multiple part) uploads can be utilized to increase upload throughput, and to reduce a transmission cost of upload failures. In a multipart upload, a computer can divide one file into multiple parts, and transmit these multiple parts to a second computer. The computer can receive the multiple parts, and assemble the original file from them.

In some examples, multipart uploads can be used to begin transmitting a file before that file has been fully created (e.g., uploading a video as the video is being taken). In some examples, multipart uploads can reduce a transmission cost of upload failures where a transmission failure can result in a single part of a file being re-uploaded, rather than the entire file being re-uploaded.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a file in parts, the parts comprising a first part, a second part, and a third part. The system can, in response to receiving the first part, the first part having a first part number and a first value of a first length, write the first part to a first temporary file that corresponds to the first value at a first location of the first temporary file based on the first part number. The system can, in response to receiving the second part, the second part having a second part number and a second value of a second length, and in response to the second value equaling the first value, write the second part to the first temporary file at a second location of the first temporary file based on the second part number. The system can, in response to receiving the third part, the third part having a third part number and a third value of a third length of the third part, and in response to the third value differing from the first value, write the third part to a second temporary file at a third location of the second temporary file based on the third part number. The system can, after receiving the first part, the second part, and the third part, write data of the second temporary file to an end of the first temporary file. The system can change a first name of the first temporary file to a second name of the file.

An example method can comprise receiving, by a system comprising a processor, a file in parts. The method can further comprise storing, by the system, a first group of the parts in a first file based on the parts of the first group of the parts sharing a first file length. The method can further comprise storing, by the system, a second part of the parts in a second file based on the second part having a second file length that differs from the first file length. The method can further comprise, after receiving the parts, appending, by the system, data of the second file to the first file. The method can further comprise modifying, by the system, a first name of the first file to a second name of the file.

An example non-transitory computer-readable medium can comprise instructions that, in response to execution, cause a system comprising a processor to perform operations. These operations can comprise receiving parts of a file. These operations can further comprise storing a first subset of the parts in a first file based on the parts of the first subset having a same size. These operations can further comprise storing a second part of the parts in a second file based on the second part having a different size from the first subset of the parts. These operations can further comprise, after receiving the parts, appending data of the second file to the first file. These operations can further comprise altering a first name of the first file to a second name of the file.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
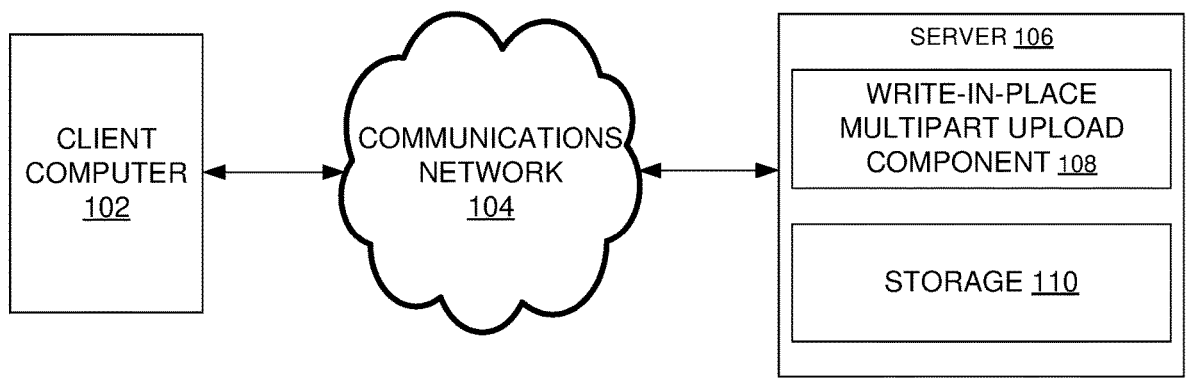
FIG. 1 illustrates an example system architecture that can facilitate write-in-place multipart uploads, in accordance with an embodiment of this disclosure.

Multipart uploads can be utilized to increase upload throughput, and to reduce a transmission cost of upload failures.

In some examples, writing content into a target file during upload of multiple parts can make completion instant upon writing the last part. However, in some examples, this approach does not work if multiple parts are uploaded with a same part number, if the parts have different sizes, or if a last part comes in before other parts.

In other approaches, a client computer uploads multiple part files, which a server concatenates upon completion of the uploads. To concatenate the parts into one file, the server can read all of the parts and write them into one file, which can be a time-consuming process.

Approaches according to the present techniques can improve speed of multipart uploads by addressing these limitations. In some examples, semi-instant completion can be achieved in some cases, while preserving functionality in other cases.

The present techniques can be utilized to reduce data movement on upload completion in a common workflow by uploading data directly into an anticipated position of a final file.

In an example, this common workflow for multipart uploads can comprise breaking an uploaded object into equal sized parts (possibly excluding the final part). Parts are re-uploaded in the case of a transmission failure, and a re-uploaded part is the same size as the original part. Uploaded parts (save for the final part) are used in the final file at complete time. Part numbers start at 1. There is not a gap left in the sequence of part numbers at completion time.

During this workflow, when these conditions are met, all parts can be uploaded directly into an appropriate position in a temporary file in a part directory. Then, upon completion, no data movement can be required to assemble the final file. This type of workflow can be processed by writing parts in place in the complete file, which can save time by not concatenating the uploads upon completion. This workflow can be referred to as being performed on a first path, or an accelerated path, and can be viewed in contrast to performing a multipart upload according to a second path, or a default path.

There can be another workflow, with the following characteristics. Clients can re-upload parts with a same part number, with a same part size or a different part size. The server does not know how many parts are going to be uploaded in advance. Parts can have different sizes. Parts can arrive out of order. Parts can arrive after completion has started (where completion involves a server moving data from partial files into a complete file). Completion requests do not have to use all parts, and a sequence of part numbers can have gaps.

In some examples, writing the content of parts to a target file during upload does not work because a server does not know the part sizes in advance. For example, the server can receive part number 5, with part length 100. The server can assume there will be parts 1, 2, 3, and 4 but still not know those parts' size. As a result, the server does not know at what offset within a complete file to begin writing part 5.

The following approach can be used for multipart file uploads according to the present techniques. At upload, a .part number file (which can be referred to as a "dot file" or a ".part num" file) can be created, and data can be written to a #<length> file (which can be referred to as a "hash file") by determining an offset based on a length of the part (which can be referred to as "ContentLength") and the part number (e.g., #200 where the part length is 200 bytes). After data is written to the # file successfully, where a hash value (such as a Message-Digest 5 (MD5) hash value) is used for an entity tag (sometimes referred to as an "Etag," an Etag can identify a particular version of a resource, such as an uploaded part file), a determined MD5 value of the part data can be stored to the dot file. The server can also set an attribute "length," which stores a length of the part to the # file.

If an upload fails to create a dot file, that can indicate that the part number has previously been uploaded. In that case, the part can be uploaded as a dot file (.<part number>) in a parts directory.

In some examples, where in-place write fails the corresponding dot file can be removed, and the next part being uploaded can still use an in-place write. Where a node crashes, a dot file may be left without a length attribute set. In this case, a next upload for a part number can use an approach where the part number is assembled as part of the full file after all parts have been uploaded.

In some examples, a multipart upload process does not expire, or automatically complete. Rather, in some examples, a client sends a complete message to a server to indicate that a multipart upload has finished transmitting. In examples where a server stores each received part file as a separate file, completion can comprise the server concatenating the various part files to assemble an uploaded copy of the file that was uploaded in multiple parts.

During completion, a server can check if all conditions are met for an accelerated path upload. If not all conditions are met, hash files and dot files can be used to assemble parts into the final file by reading the data and writing it to the final position.

In some examples where a final part has a different size, only the final part is appended to the temporary file. To prevent other processes from uploading a new part with the file's part number with the same size of the first part during completion, the server can lock the hash file and truncate to a determined offset where the final part begins. After everything is done, the file can be renamed to the target file.

On a default path, content of each part number can be retrieved by checking a dot file first, then a hash file if the dot file has a length attribute set.

When the conditions are met to use an accelerated path (e.g., breaking an uploaded object into equal sized parts (possibly excluding the final part); re-uploading parts in the case of a transmission failure, where a re-uploaded part is the same size as the original part; using uploaded parts (save for the final part) in the final file at complete time; starting part numbers at 1; and there not being a gap left in the sequence of part numbers at completion time), a CompleteMultipartUpload operation can be nearly free in terms of time to complete. That is, in some examples, no data copy is required. Then, in the default path, when any of the conditions are broken, the latency of CompleteMultipartUpload will not regress from the baseline.

The following example utilizes the accelerated path approach.

Part number 3 is uploaded with length 100. In the parts directory, there are two files for part number 3: #100 (100 bytes of data is written with offset 200), and 0.3 (attribute: length=100, etag=<etag value>).

Part number 1 is uploaded with length 200. In the parts directory, there are four files. There are #100 and 0.3 as before. Then there are files 0.1 (attribute: length=200, etag=<etag value>) and #200 (200 bytes of data are written with offset 0).

Part number 2 is uploaded with length 200. In the parts directory, there are five files. There are #100, 0.1, and 0.3 as before. Then there are files 0.2 (attribute: length=200, etag=<etag value>) and a modified #200 (where bytes 0-199 are part 1's data, and bytes 200-399 are part 2's data).

On completion, the server checks if all conditions are met. If so, the server concatenates 0.3's data from #100 to #200.

Then, #200 is renamed to the target file name.

In some examples, a client can perform a MPU by following a particular workflow in terms of number of parts, size of parts, etc. In such examples, the MPU data can be stored directly into what will ultimately be a completed file on the server, with no little-or-no data movement during a concatenation operation on complete.

Regarding other operations with multipart uploads, for an abort multipart upload, #length files and dot files for a particular upload ID can be removed on abort, along with existing corresponding part files.

Example Architectures

FIG. 1 illustrates an example system architecture 100 that can facilitate write-in-place multipart uploads, in accordance with an embodiment of this disclosure. System architecture 100 comprises client computer 102, communications network 104, and server 106. In turn, server 106 comprises write-in-place multipart upload component 108, and storage 110.

Figure 15:
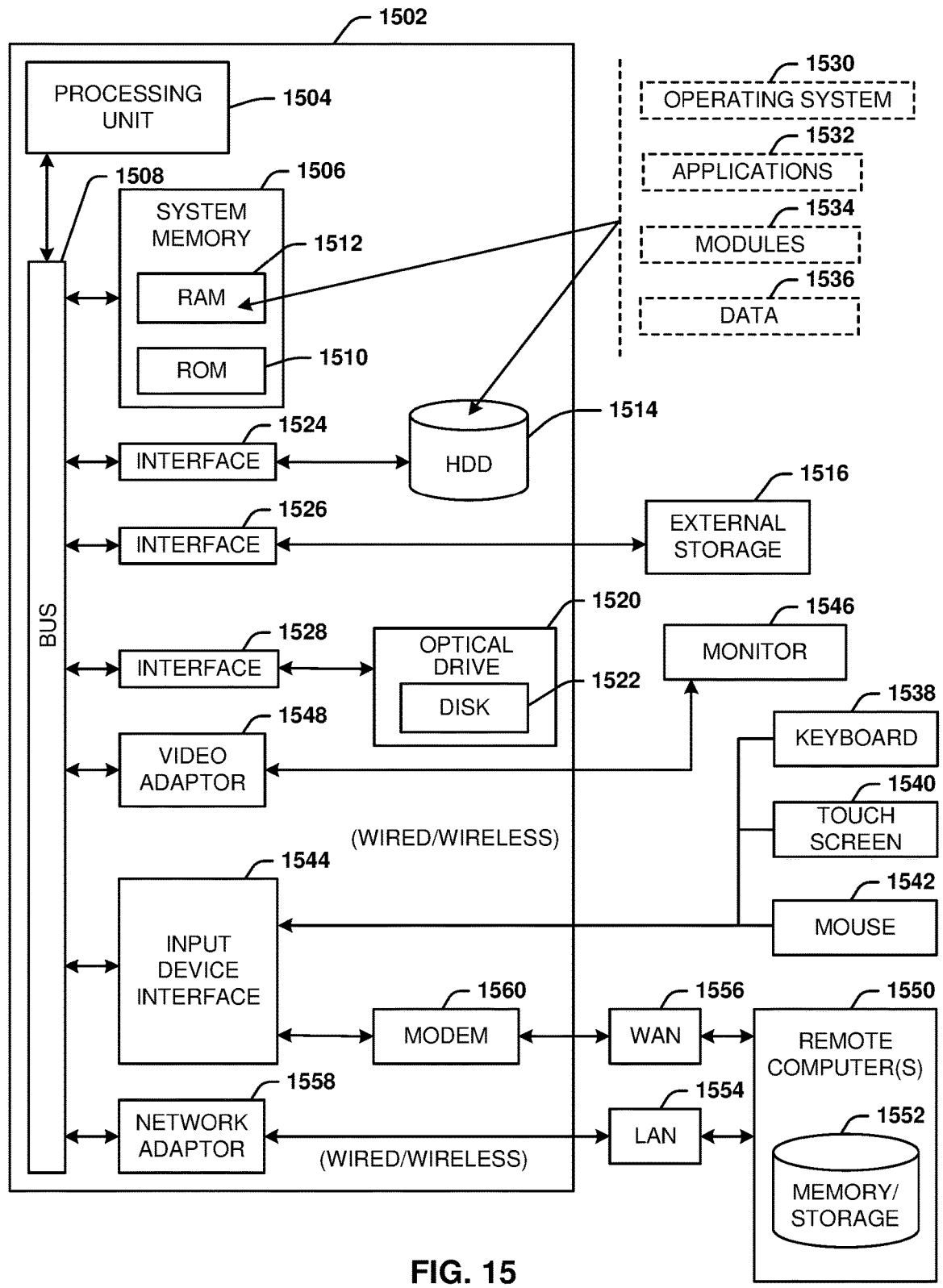
FIG. 15 illustrates an example block diagram of a computer operable to execute an embodiment of this disclosure.

In some examples, client computer 102 and/or server 106 can be implemented with one or more instances of computer 1502 of FIG. 15.

Communications network 104 can comprise a computer communications network, such as the Internet, or an isolated private computer communications network, which can be used for computer communications between client computer 102 and server 106.

Write-in-place multipart upload component 108 can comprise a component that processes multipart uploads from client computer 102, and stores this uploaded data in storage 110 (which can comprise computer storage or computer memory).

In some examples, a write-in-place multipart upload can be performed according to a first communications protocol, while a later access of the uploaded data (by client computer 102 or by another computer) can be performed according to a second communications protocol. For example, the first communications protocol can be an object storage protocol that treats data as objects (which can involve a flat address space), whereas the second communications protocol can be a file storage protocol that stores data as files in a directory structure, or a block storage protocol that accesses stored data (which can be stored in a file system) as data blocks from a disk. An example of a second communications protocol used to access data on server 106 can be a Network File System (NFS) protocol or a Server Message Block (SMB) protocol.

Figure 2:
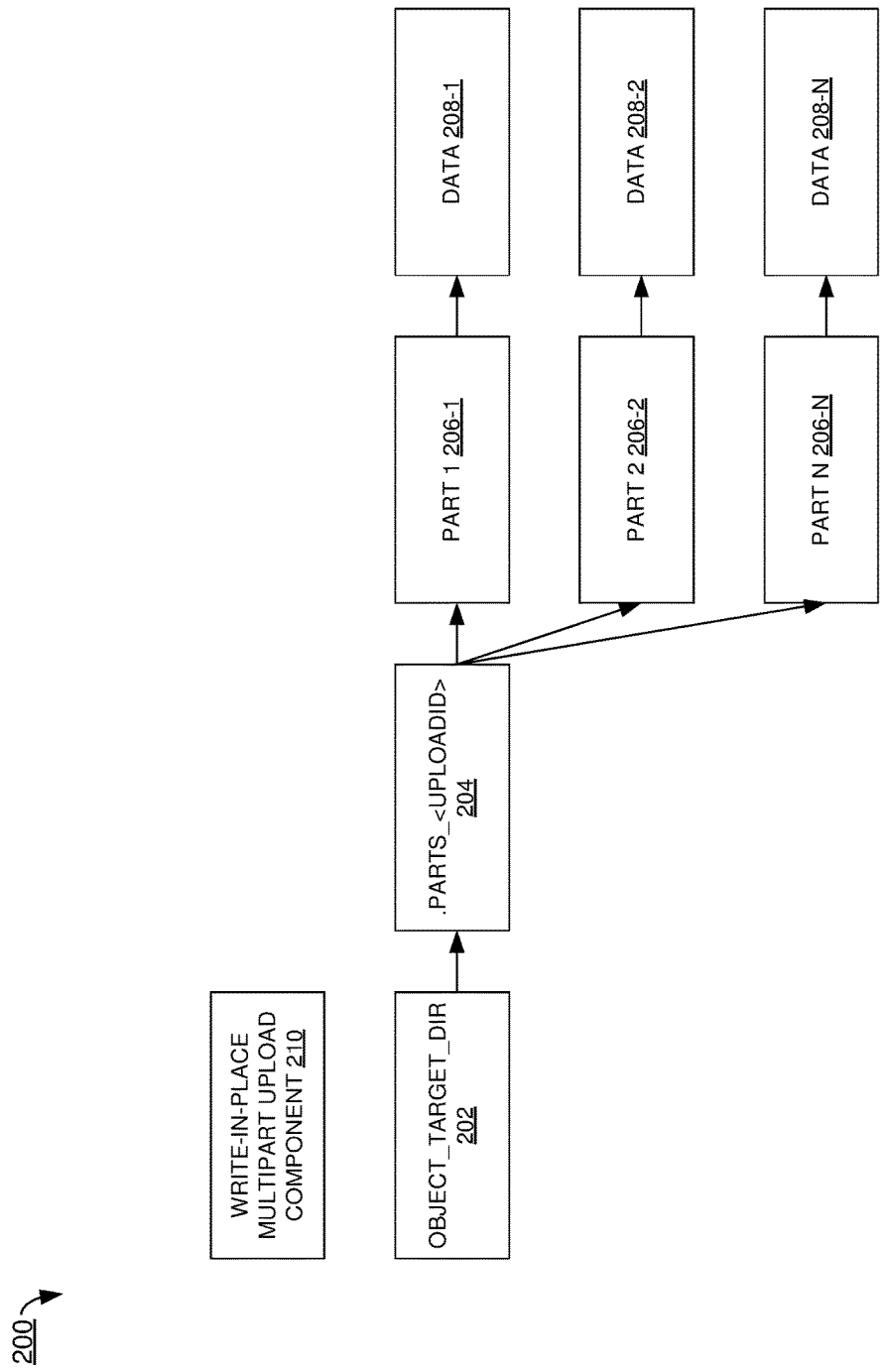
FIG. 2 illustrates an example system architecture for uploading parts in a multipart upload, in accordance with an embodiment of this disclosure.
Figure 3:
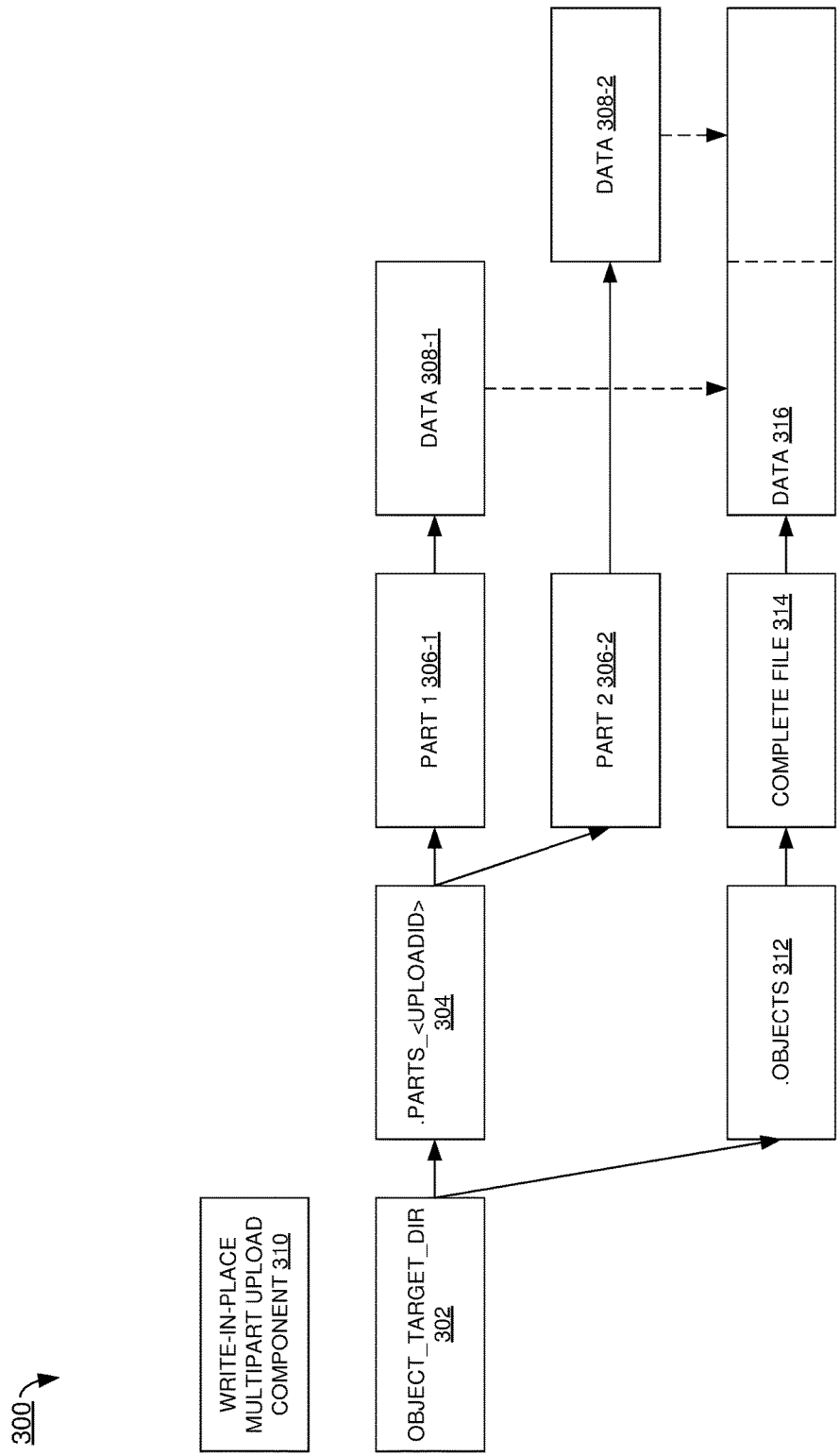
FIG. 3 illustrates an example system architecture for completing a multipart upload, in accordance with an embodiment of this disclosure.
Figure 4:
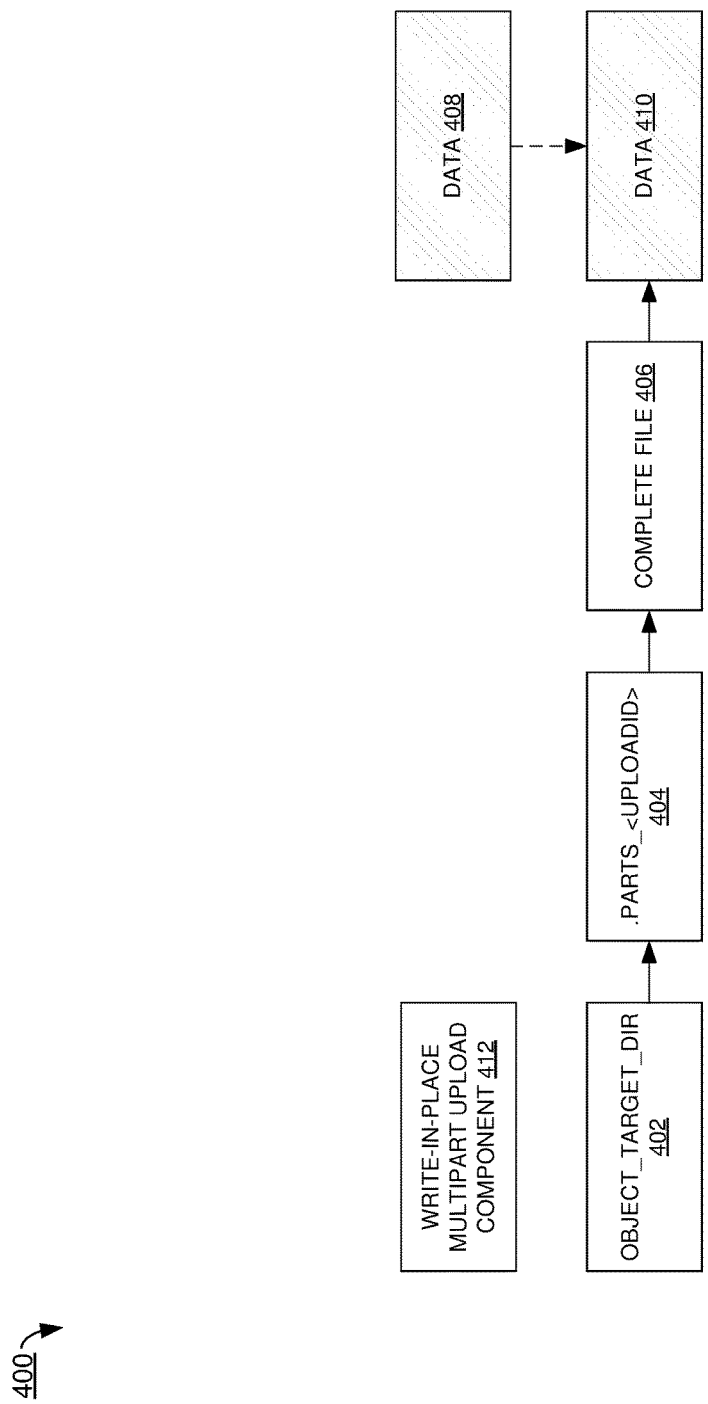
FIG. 4 illustrates an example system architecture for a write-in-place multipart upload where parts are received in order, in accordance with an embodiment of this disclosure.
Figure 5:
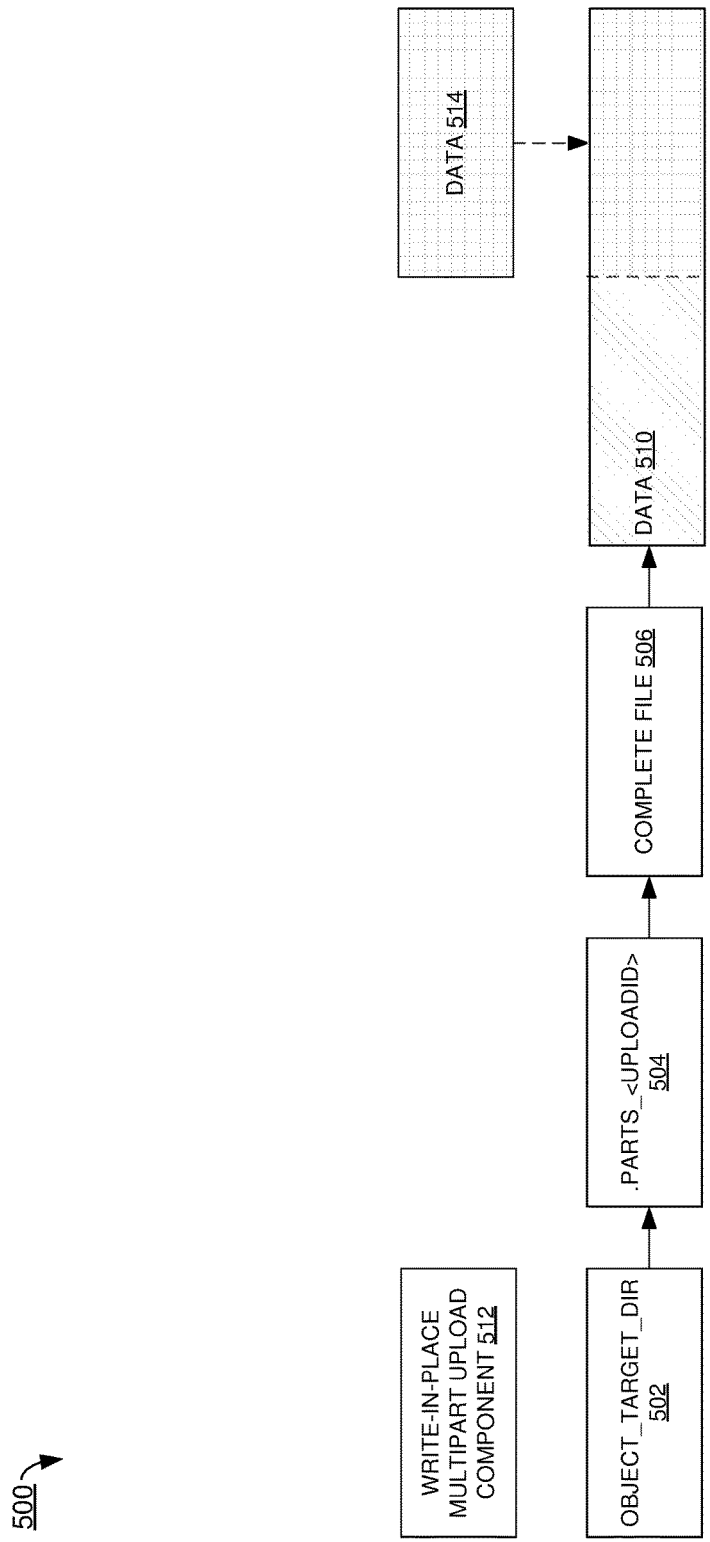
FIG. 5 illustrates another example system architecture for a write-in-place multipart upload where parts are received in order, in accordance with an embodiment of this disclosure.
Figure 6:
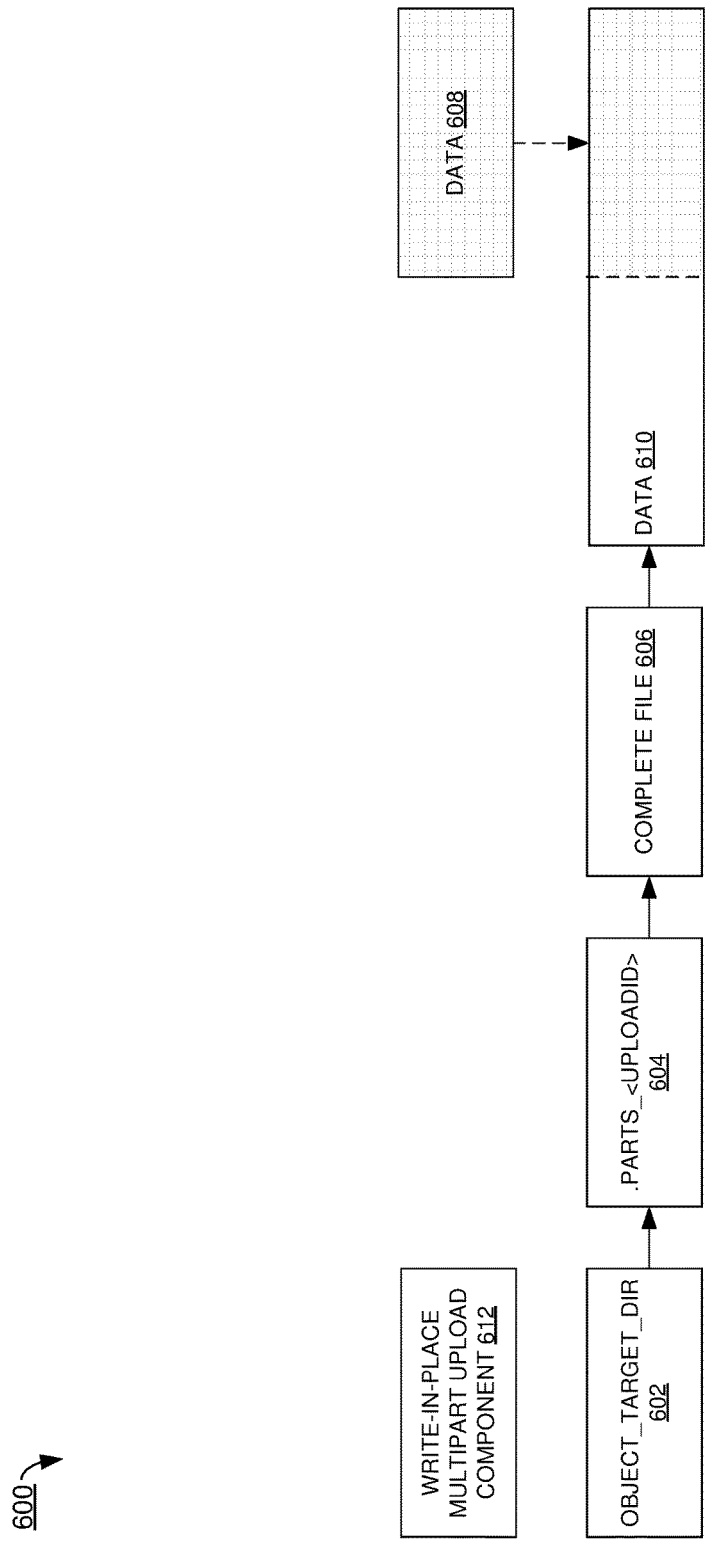
FIG. 6 illustrates an example system architecture for a write-in-place multipart upload where parts are received out of order, in accordance with an embodiment of this disclosure.
Figure 7:
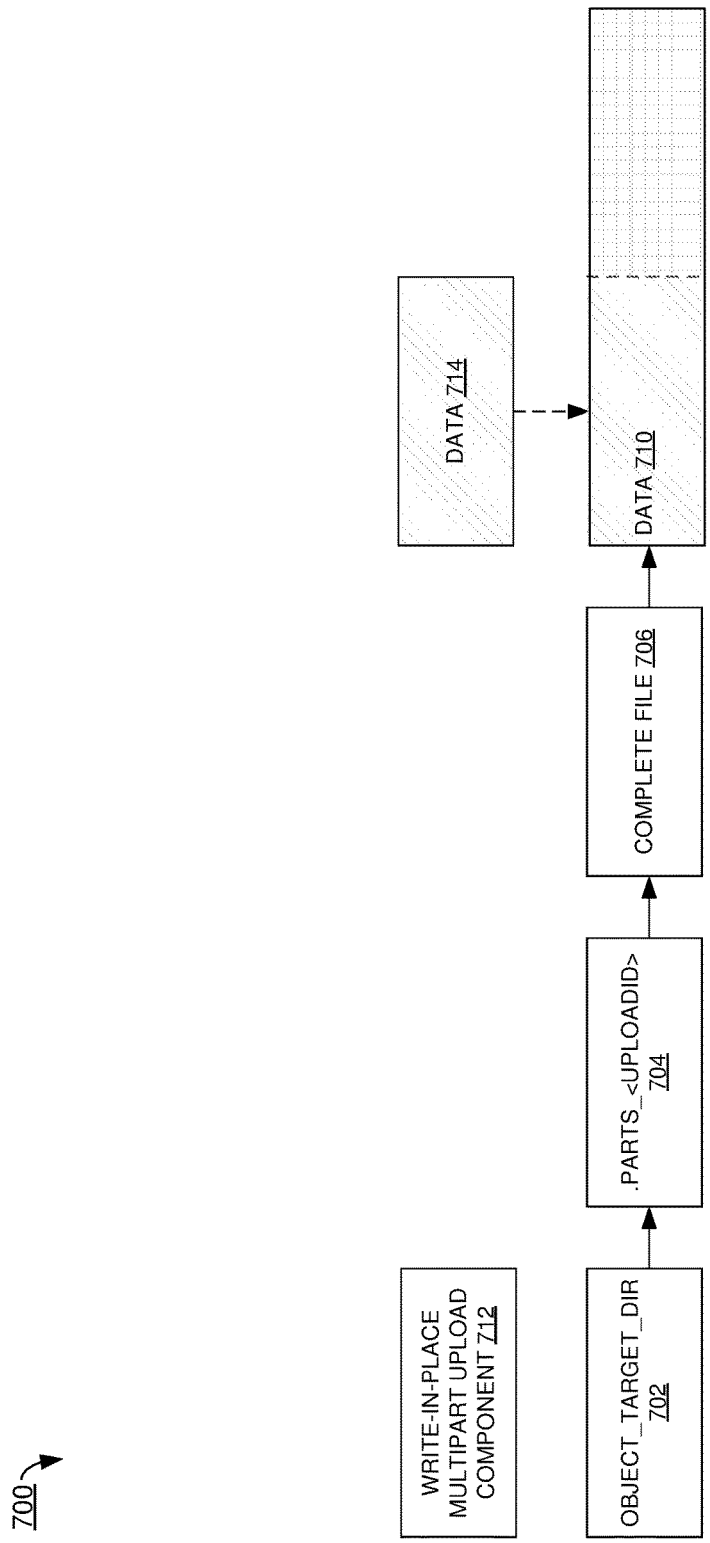
FIG. 7 illustrates another example system architecture for a write-in-place multipart upload where parts are received out of order, in accordance with an embodiment of this disclosure.
Figure 8:
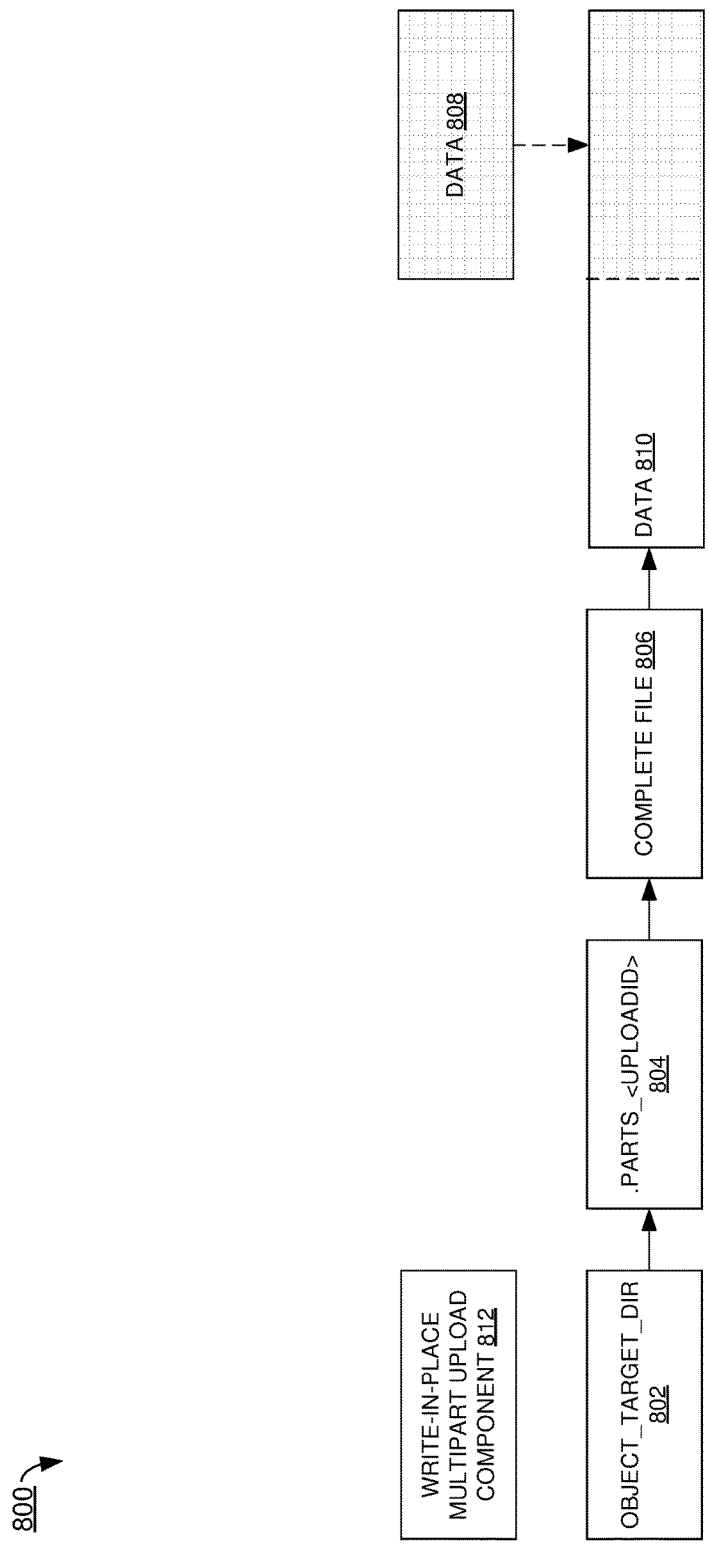
FIG. 8 illustrates an example system architecture for re-uploading a part with a different file size to facilitate write-in-place multipart uploads, in accordance with an embodiment of this disclosure.
Figure 9:
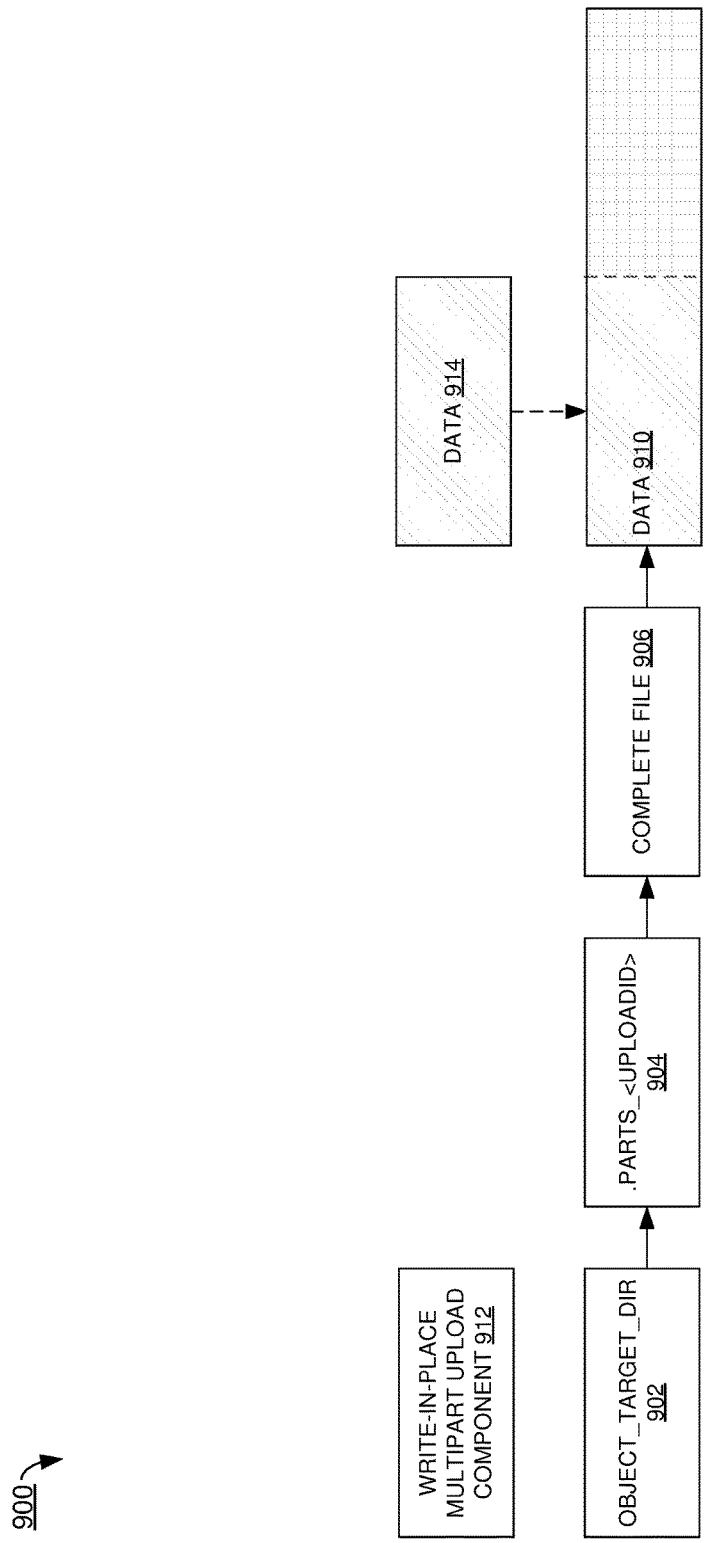
FIG. 9 illustrates another example system architecture for re-uploading a part with a different file size to facilitate write-in-place multipart uploads, in accordance with an embodiment of this disclosure.
Figure 10:
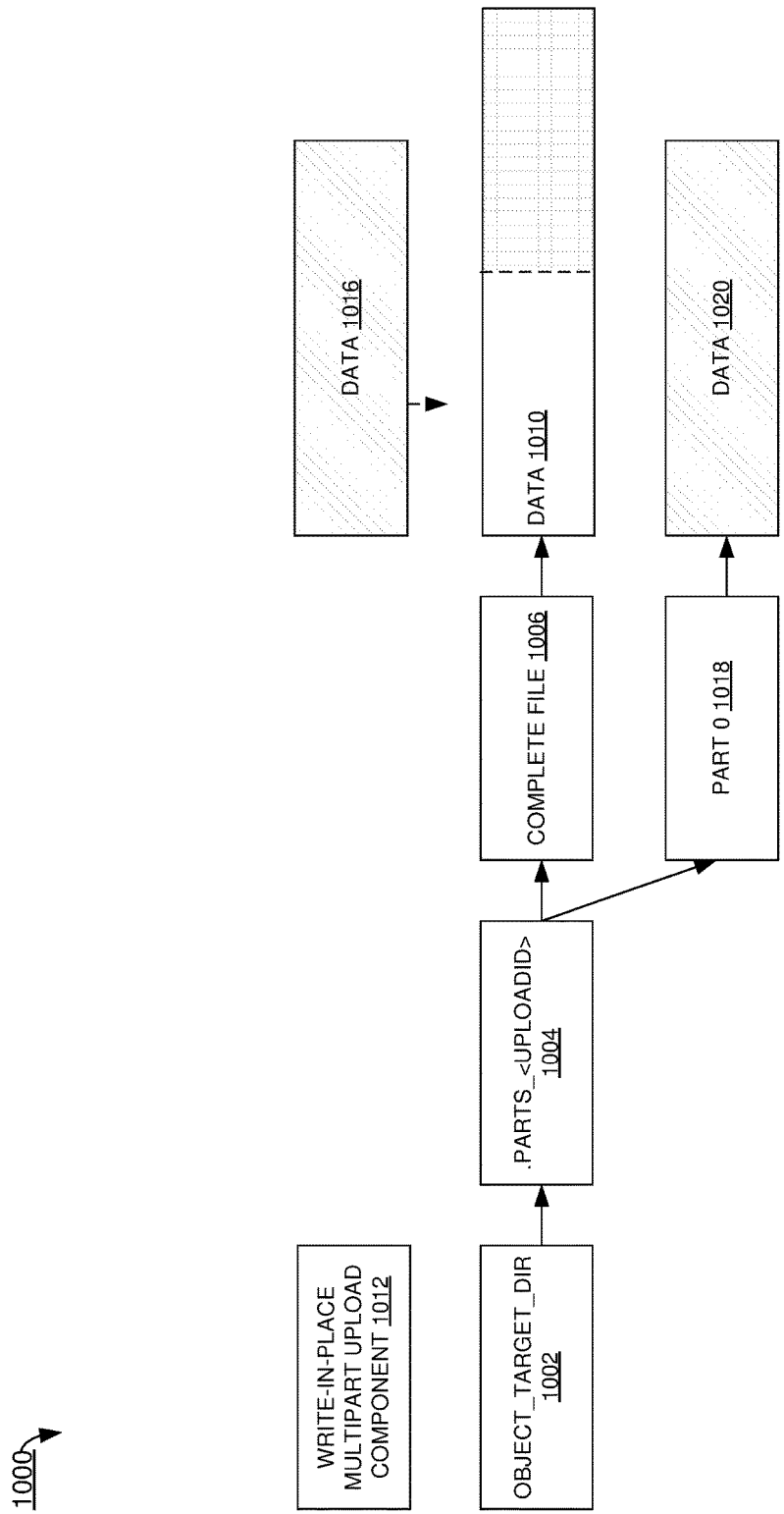
FIG. 10 illustrates another example system architecture for re-uploading a part with a different file size to facilitate write-in-place multipart uploads, in accordance with an embodiment of this disclosure.
Figure 11:
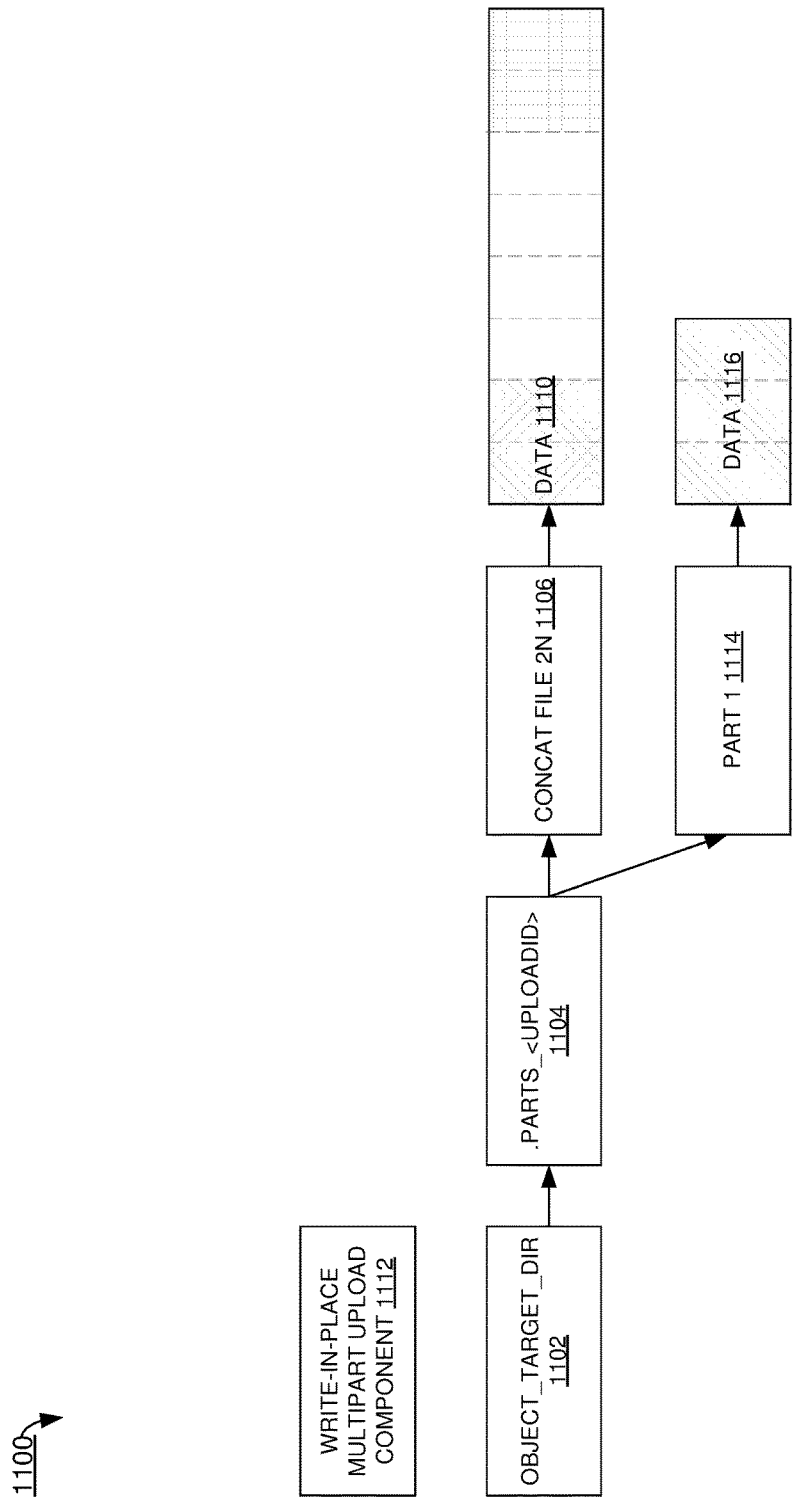
FIG. 11 illustrates an example system architecture for processing a list parts operation to facilitate write-in-place multipart uploads, in accordance with an embodiment of this disclosure.

In the course of implementing write-in-place multipart uploads, write-in-place multipart upload component 108 can implement part(s) of system architecture 200 of FIG. 2, system architecture 300 of FIG. 3, system architecture 400 of FIG. 4, system architecture 500 of FIG. 5, system architecture 600 of FIG. 6, system architecture 700 of FIG. 7, system architecture 800 of FIG. 8, system architecture 900 of FIG. 9, system architecture 1000 of FIG. 10, and/or system architecture 1100 of FIG. 11.

Figure 12:
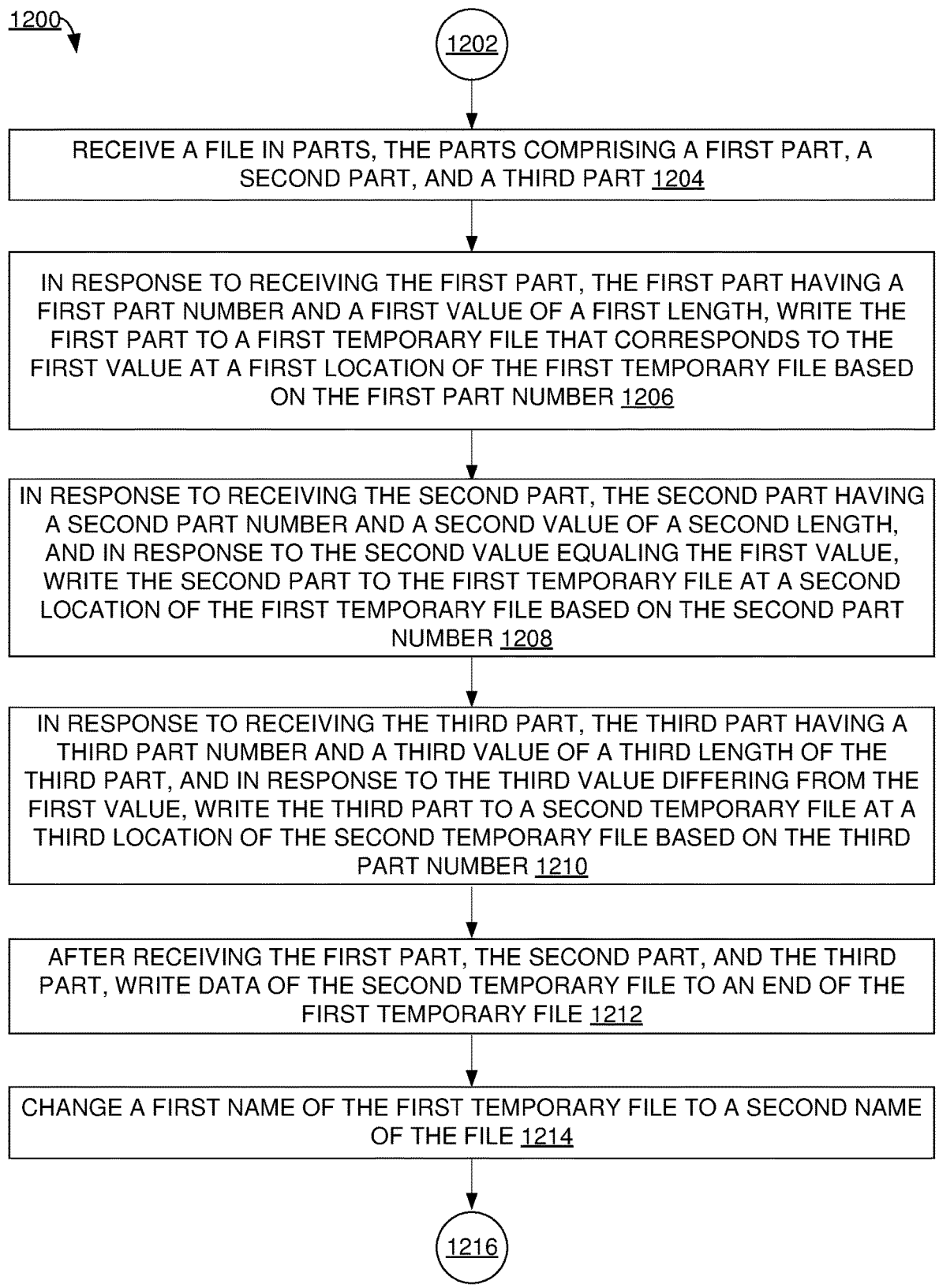
FIG. 12 illustrates an example process flow for write-in-place multipart uploads, in accordance with an embodiment of this disclosure.
Figure 13:
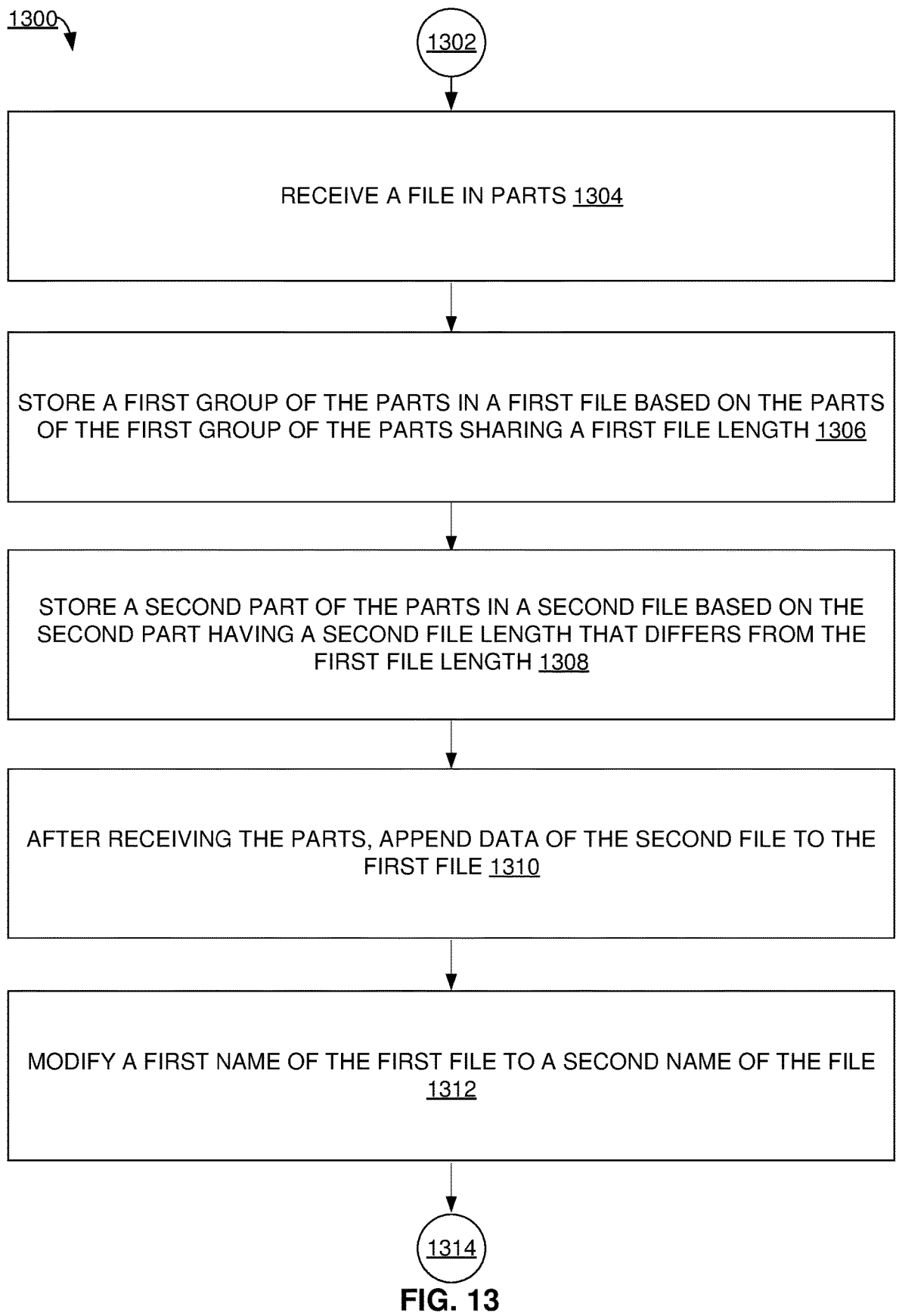
FIG. 13 illustrates another example process flow for write-in-place multipart uploads, in accordance with an embodiment of this disclosure.
Figure 14:
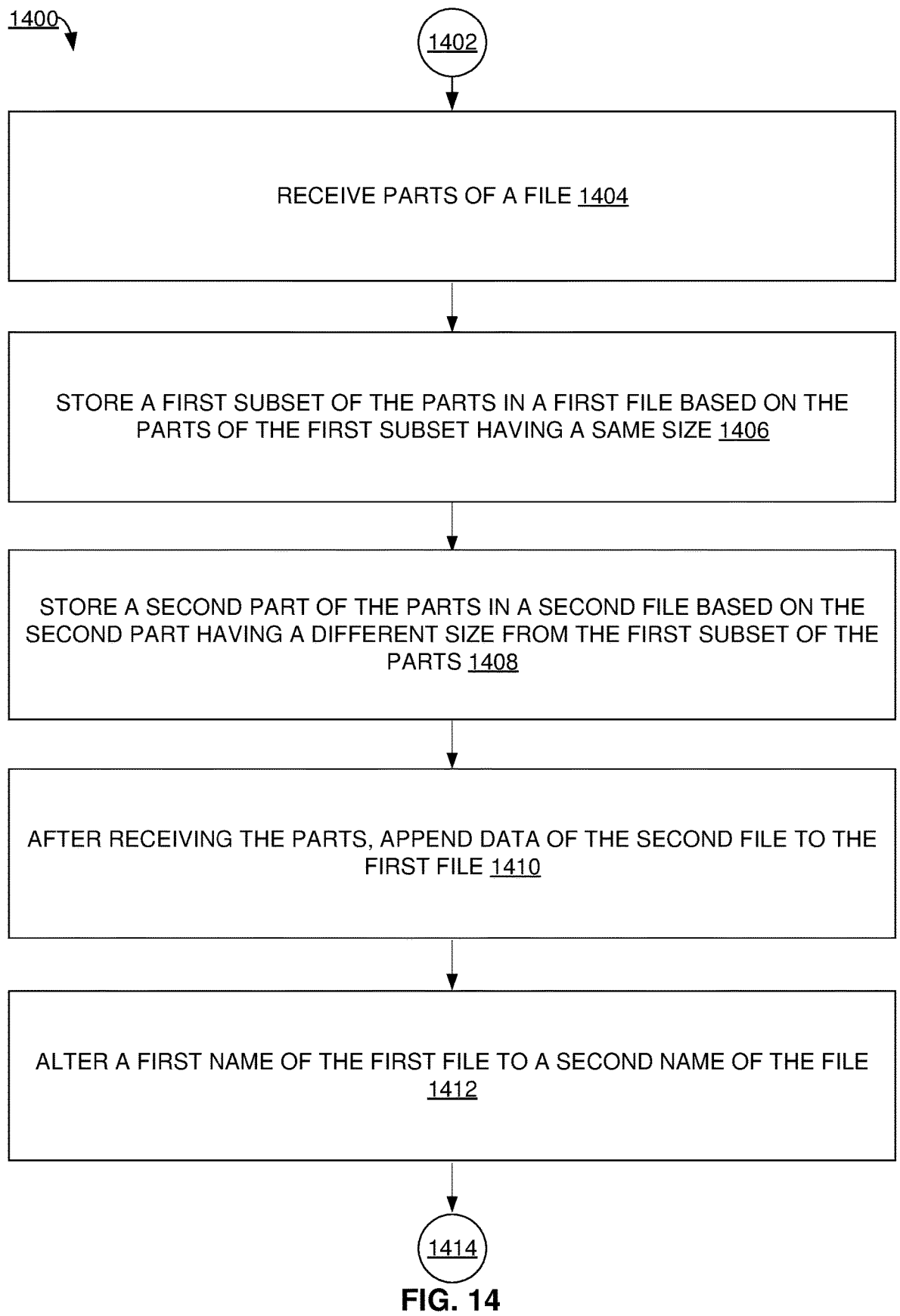
FIG. 14 illustrates another example process flow for write-in-place multipart uploads, in accordance with an embodiment of this disclosure.

Additionally, in the course of implementing write-in-place multipart uploads, write-in-place multipart upload component 108 can implement part(s) of process flow 1200 of FIG. 12, process flow 1300 of FIG. 13, and/or process flow 1400 of FIG. 14.

FIG. 2 illustrates an example system architecture 200 for uploading parts in a multipart upload, in accordance with an embodiment of this disclosure. In some examples, parts of system architecture 200 can be implemented by write-in-place multipart upload component 108 of FIG. 1 to effectuate write-in-place multipart uploads.

As depicted, system architecture comprises object_target_dir 202, .parts_<uploadID> 204, part 1 206-1, part 2 206-2, part N 206-N, data 208-1, data 208-2, and data 208-N. Each of object_target_dir 202, and .parts_<uploadID> 204 can comprise a directory in a computer file system. Each of part 1 206-1, part 2 206-2, and part N 206-N can comprise files in the computer file system. Each of data 208-1, data 208-2, and data 208-N can comprise data that is stored in the computer file system. Write-in-place multipart upload component 210 can be similar to write-in-place multipart upload component 108 of FIG. 1.

A client can upload a file to a server in multiple parts, and the server can store the parts using system architecture 200. Object_target_dir 202 can specify an object being uploaded; e.g., for each object that is uploaded, a different instance of object_target_dir 202 can be created.

.parts_<uploadID> 204 can be used to store upload parts for a particular uploadID of the object. In some examples, an object can be uploaded multiple different times, and each time a new .parts_<uploadID> 204 directory is created, which uses an uploadID of the instance of the upload in the directory name.

Part 1 206-1, part 2 206-2, part N 206-N can each be part files that contain data for a particular part number of an upload. Then, data 208-1, data 208-2, and data 208-N can be the respective data that is stored in those directories.

When the data of a multipart upload is received, it can be concatenated as shown in system architecture 300 of FIG. 3.

FIG. 3 illustrates an example system architecture 300 for completing a multipart upload, in accordance with an embodiment of this disclosure. In some examples, parts of system architecture 300 can be implemented by write-in-place multipart upload component 108 of FIG. 1 to effectuate write-in-place multipart uploads. System architecture 300 can illustrate completing a multipart upload after the parts are uploaded as in system architecture 200 of FIG. 2.

In some examples, object_target_dir 302 can be similar to object_target_dir 202 of FIG. 2, .parts_<uploadID> 304 can be similar to .parts_<uploadID> 204, part 1 306-1 can be similar to part 2 206-1, part 2 306-2 can be similar to part 2 206-2, data 308-1 can be similar to data 208-1, data 308-2 can be similar to data 208-2, and write-in-place multipart upload component 310 can be similar to write-in-place multipart upload component 210.

.objects 312 can comprise a directory in which complete files are stored, and complete file 314 can comprise a complete version of a file uploaded via a multipart upload, with data 316 being the data of complete file 314. After the file parts are received, a "complete" message can be received, indicating that the parts can be assembled into a complete file (e.g., there is not another part file coming).

A file can be completed by copying or moving data from data 308-1 and data 308-2 to corresponding locations in data 316. Upon copying or moving of this data, complete file 314 can be the file that was uploaded in multiple parts.

Multipart upload parts can be uploaded to a server via a specified upload part operation. The server can store parts in a hidden directory (e.g., .parts_<uploadID> 304) as separate part files (e.g., part 1 306-1).

When a client has finished uploading the parts, the client can send the server a complete multipart upload message, and the server can concatenate the separate part files into one complete version of the file (e.g., complete file 314) that was uploaded in parts. As part of concatenating the parts, the server can read the data of each part file and write it to an appropriate location in a complete file. The server can then rename the complete file into a target object directory (a location that the client indicated to upload the file to), and the server can remove the part files.

In some examples, this approach to completing a multipart upload can have latency, where a byte-by-byte data copy is made from the part files to the complete file.

Other of the present techniques can be implemented to reduce latency of a complete operation, and therefore reduce a total latency of a multipart upload operation.

FIG. 4 illustrates an example system architecture 400 for a write-in-place multipart upload where parts are received in order, in accordance with an embodiment of this disclosure. In some examples, parts of system architecture 400 can be implemented by write-in-place multipart upload component 108 of FIG. 1 to effectuate write-in-place multipart uploads.

In some examples, object_target_dir 402 can be similar to object_target_dir 202 of FIG. 2, .parts_<uploadID> 304 can be similar to .parts_<uploadID> 204, and write-in-place multipart upload component 412 can be similar to write-in-place multipart upload component 108 of FIG. 1. Complete file 406 can be similar to complete file 314 of FIG. 3, data 410 can be similar to data 316, and data 408 can be similar to data 308-2.

When parts are received in order (e.g., part 1 is received before part 2), space can be allocated for data 410 as parts are received. So, as just one part has been received (and there is no earlier part yet to be received), space for just the one part can be allocated in data 410 at the time.

In this manner write-in-place MPUs can be effectuated, where parts are received in of order.

FIG. 5 illustrates another example system architecture 500 for a write-in-place multipart upload where parts are received in order, in accordance with an embodiment of this disclosure. In some examples, parts of system architecture 500 can be implemented by write-in-place multipart upload component 108 of FIG. 1 to effectuate write-in-place multipart uploads.

In some examples, object_target_dir 502 can be similar to object_target_dir 402 of FIG. 4, .parts_<uploadID> 504 can be similar to .parts_<uploadID> 404, complete file 506 can be similar to complete file 406, data 510 can be similar to data 410, and write-in-place multipart upload component 512 can be similar to write-in-place multipart upload component 412. Data 514 can be similar to data 308-1 of FIG. 3.

System architecture 400 of FIG. 4 illustrates an example where parts are received in of order, and written to a complete file (complete file 406) in their appropriate location. In system architecture 500, an earlier part (data 408 of FIG. 4) was already received, and now data 514 of a subsequent part is being received. Space can be allocated for data 514 in data 510 and data 514 can be written to data 510.

In this manner write-in-place MPUs can be effectuated, where parts are received in order.

The following example workflow can be implemented by a client as part of a MPU. In some examples, a client can implement this workflow to increase upload throughput and to reduce a transmission cost of upload failures:

1. The uploaded object is broken into equal size parts (excluding the final part).
2. Parts are re-uploaded in the case of transmission failure; the re-uploaded part will be the same size at the original.
3. Uploaded parts (excluding the final part) are used in the final file at complete time.
4. Part numbers start from 1.
5. At completion time, the sequence of part numbers is contiguous (e.g., 1, 2, 3, etc.)

Where the conditions of this workflow are met, parts can be uploaded directly into an appropriate position in a temporary file in a part directory. On a complete operation, it can be that no data movement is involved in assembling the final file (past possibly moving the final part). If the final part has different size, the final part can be appended to the temporary file. After the parts are uploaded, and the final part is concatenated to the rest of the parts, where appropriate, the temporary file can be renamed with a name of the file uploaded by the client.

The server can create or modify two files when a part is uploaded—a "#length file" (which can be referred to as a hash file, even where a hash function is not used in conjunction with the file), and a "dot file."

The server can create (or modify, where it already exists), a "#length" file that stores data for the part. A #length file can store data based on a length of a part. E.g., a #200 file can store data from parts that have 200 bytes of data, and a #100 file can store data from parts that have 100 bytes of data. Data from a part being uploaded can be stored in the corresponding #length file based on its part number and its data length. For example, part 1 of a file can be stored at offset zero in its #length file. Part 3 of a file that has 200 bytes of data can be stored at offset 600 in its #200 file (e.g., 3*200).

The server can create a "dot file" for the part (e.g., file "0.2" where part 2 is uploaded, or file "0.5" where part 5 is uploaded). After data of a part is written to its #length file successfully, where a MD5 value is used for an etag value, then the MD5 value can be determined and stored to the corresponding dot file as a user attribute. A user attribute for length can also be stored to the dot file, which can store a length of the part in bytes.

In an example where another upload failed to create a dot file with an associated error identifying that the dot file already exits (e.g., an EEXIST error), this can indicate that that part number is not being uploaded for the first time (e.g., there was a previous upload of this part number for the file). In this example, the part can be uploaded according to the default path.

In some examples where another upload failed to create a dot file with an associated error identifying that the dot file already exits, dot files can be maintained to use write-in-place where the corresponding part files have the same size. For example, hash file #100 has data for both part 1 and part 2, and part 2 is re-uploaded with a same size as before. On re-upload, part 2 can be written to a part file (0.2), and then copied to hash file #100 on completion.

In examples where an in-place write for a part fails, the dot file for that part can be removed, and a next upload of that part can be attempted with in-place writing. In some examples, a server node crash can leave a dot file present, but without a length attribute set. In this example, a next upload for that part number can use a default path.

This approach can provide for a last part of a MPU with a smaller size to be received by the server before other parts.

During completion, a server can check that conditions are met for an accelerated path. Where not all conditions are met, the #length files and normal part files can be used to assemble parts into a final file by reading data from those files and writing it to a final position in a final file.

In some examples, when the conditions are met for the accelerated path, the complete operation can be performed quickly because there is not data copy into a final version of the file. Then, when not all conditions are met and a default path is used, a latency for the complete operation does not regress from a baseline performance for multipart uploads. That is, in these examples, it does not take more time to attempt to use the accelerated path before falling back on the default path because not all accelerated path conditions are met.

Re-uploaded parts can be handled as follows. In some examples, the re-uploaded part is the same size as the previous version of the part. In these examples, when the part is first uploaded, a dot file is created for the file. Where the dot file for the part cannot be created, a default path approach is used. Additionally, a #length file is created. A location where the part is written to the #length file can be calculated by multiplying the part index by the part size. For example, if the first part uploaded is index 2 with size 10 MiB, the part can be written to offset 20 MiB.

Subsequently uploaded parts of a same part size can be uploaded into the #length file. In some examples, parts can be uploaded out of order, and sparse regions can be left in the file for gaps until those corresponding part files are received. After data for a part file is successfully written to a #length file, where an option is set to use a MD5 as an etag, a determined MD5 value can be written to the dot file in the same way as with a normal part file. The part length can be stored in the dot file as a user attribute with key "length."

At uploading, parts with different sizes can be uploaded to multiple respective #length files.

FIG. 6 illustrates an example system architecture 600 for a write-in-place multipart upload where parts are received out of order, in accordance with an embodiment of this disclosure. In some examples, parts of system architecture 600 can be implemented by write-in-place multipart upload component 108 of FIG. 1 to effectuate write-in-place multipart uploads.

In some examples, object_target_dir 602 can be similar to object_target_dir 402 of FIG. 4, .parts_<uploadID> 604 can be similar to .parts_<uploadID> 404, complete file 606 can be similar to complete file 406, data 610 can be similar to data 410, and write-in-place multipart upload component 612 can be similar to write-in-place multipart upload component 412. Data 614 can be similar to data 308-2 of FIG. 3.

When parts are received out of order (e.g., part 2 is received before part 1), the parts can be written to data 610, and space in complete file 606 before a location where that part is stored can be allocated, even though there is not yet data to be stored there (e.g., part 1 has not yet been received).

In this manner write-in-place MPUs can be effectuated, where parts are received out of order.

FIG. 7 illustrates another example system architecture 700 for a write-in-place multipart upload where parts are received out of order, in accordance with an embodiment of this disclosure. In some examples, parts of system architecture 700 can be implemented by write-in-place multipart upload component 108 of FIG. 1 to effectuate write-in-place multipart uploads.

In some examples, object_target_dir 702 can be similar to object_target_dir 402 of FIG. 4, .parts_<uploadID> 704 can be similar to .parts_<uploadID> 404, complete file 706 can be similar to complete file 406, data 710 can be similar to data 410, and write-in-place multipart upload component 712 can be similar to write-in-place multipart upload component 405. Data 714 can be similar to data 308-1 of FIG. 3.

System architecture 400 of FIG. 4 illustrates an example where parts are received out of order, and written to a complete file (complete file 406) in their appropriate location. In system architecture 700, an earlier part (data 714) has now been received (e.g., part 1 has been received after part 2 was received).

Since space for data 714 was already allocated in data 410, data 714 can be written in place to data 710 without moving other data (e.g., data 408, which was already written to data 710).

In this manner write-in-place MPUs can be effectuated, where parts are received out of order.

In some examples, an issue with uploading parts in any order can be that large sparse files can be created. For example, where a part is uploaded with a 4 gigabyte (GB) size and a part number of 1,000, a 4 terabyte (TB) file can be created. In some examples, a sparse file does not affect a physical or filesystem logical quota, but it can affect some quotas.

An example of a physical quota that is not affected by a sparse file can be affected is a physical quota that counts actual block usage, including protection overhead. An example of a filesystem quota that is not affected by a sparse file can be a filesystem logical quota that counts allocated blocks, excluding protection overhead. An example of a quota that can be affected is a quota counts file size including sparse regions (so the quota value can become big).

To mitigate against this issue where a sparse file can affect some quotas, in some examples, if a part file with a part number greater than 32 is created, and if that is the first part for a #length file, then a normal part can be used for storing the file on the server.

FIG. 8 illustrates an example system architecture 800 for re-uploading a part with a different file size to facilitate write-in-place multipart uploads, in accordance with an embodiment of this disclosure. In some examples, parts of system architecture 800 can be implemented by write-in-place multipart upload component 108 of FIG. 1 to effectuate write-in-place multipart uploads.

In some examples, object_target_dir 802 can be similar to object_target_dir 402 of FIG. 4, .parts_<uploadID> 804 can be similar to .parts_<uploadID> 404, complete file 806 can be similar to complete file 406, data 810 can be similar to data 410, and write-in-place multipart upload component 812 can be similar to write-in-place multipart upload component 412. Data 608 can be similar to data 308-2 of FIG. 3.

Data 608 is uploaded, and this part is uploaded out of order. A size of data 608 (let the size in this example be 2N) is allocated for a preceding part in data 610, as well as for storing data 608.

FIG. 9 illustrates another example system architecture 900 for re-uploading a part with a different file size to facilitate write-in-place multipart uploads, in accordance with an embodiment of this disclosure. In some examples, parts of system architecture 900 can be implemented by write-in-place multipart upload component 108 of FIG. 1 to effectuate write-in-place multipart uploads.

In some examples, object_target_dir 902 can be similar to object_target_dir 402 of FIG. 4, .parts_<uploadID> 904 can be similar to .parts_<uploadID> 404, complete file 906 can be similar to complete file 406, data 910 can be similar to data 410, and write-in-place multipart upload component 912 can be similar to write-in-place multipart upload component 412. Data 914 can be similar to data 308-1 of FIG. 3.

In system architecture 800, parts were received out of order. Now in system architecture 900, a previous part number is received (data 914). Data 914 has a same size as data 808, a size of 2N. So, data 914 can be written to data 910 (similar to out-of-order parts in system architecture 700 of FIG. 7).

FIG. 10 illustrates another example system architecture 1000 for re-uploading a part with a different file size to facilitate write-in-place multipart uploads, in accordance with an embodiment of this disclosure. In some examples, parts of system architecture 1000 can be implemented by write-in-place multipart upload component 108 of FIG. 1 to effectuate write-in-place multipart uploads.

In some examples, object_target_dir 1002 can be similar to object_target_dir 402 of FIG. 4, .parts_<uploadID> 1004 can be similar to .parts_<uploadID> 404, complete file 1006 can be similar to complete file 406, data 1010 can be similar to data 410, and write-in-place multipart upload component 1012 can be similar to write-in-place multipart upload component 412. Data 1016 can be similar to data 308-1 of FIG. 3. Part 0 1018 can be a file similar to part 1 206-1, and data 1020 can be similar to data 308-1.

Data 914 was uploaded in system architecture 914. Now it is reuploaded here, in the form of data 1016. Data 914 had a size of 2N, but the re-uploaded part (data 1016) has a different size of 3N. There is not room in data 1010 to store data 1016, since only size 2N was allocated for this part.

The portion of data 1010 that corresponds to the previous upload of data 1016 can be marked as invalid, and data 1016 can be stored in part 0 1018, having data 1020 (which matches data 1016).

In some examples, this can be considered to be a fallback approach. That is, where write-in-place does not succeed (because the re-uploaded part does not have the same size as all other parts), then a separate part file for the re-uploaded part can be created, and the multiple parts can be concatenated together as part of a complete operation.

Regarding re-uploads, where a part number that has already been uploaded with an accelerated path is uploaded again, this can be detected where an attempt to create a dot file fails (because that dot file already exists). In that case, the part can be uploaded according to a default path, which can use a part number as a part file. In some examples, re-uploading to a #length file can be prohibited, even where the part size is the same, to mitigate against a condition where there is a race between an upload and updating a corresponding part file.

For an upload part copy, a copied object can be written to a #length file with its size, as if the part file were being uploaded rather than copied. Where a dot file exists for that part file, the part file can be treated as a normal part file.

In some examples, as a performance optimization, an object can be cloned into an appropriate location in a #length file. In some system architectures, a file clone can share file storage blocks with an existing file, which can save storage space relative to storing separate copies of the two files. In some examples, a file clone can also be performed faster than a file copy. Blocks that are shared between a clone and cloned file can be contained in a hidden file, which can be referred to as a shadow store. When a clone is created, data originally contained in the cloned file can be transferred to a shadow store. Where both files reference the blocks from the shadow store, the two files can consume no more space than the original file; the clone does not take up any additional space on the cluster. Where a cloned file or clone is modified, the file and clone can share those blocks that are common to both of them, and the modified, unshared blocks can occupy additional space in computer storage.

FIG. 11 illustrates an example system architecture 1100 for processing a list parts operation to facilitate write-in-place multipart uploads, in accordance with an embodiment of this disclosure. In some examples, parts of system architecture 1000 can be implemented by write-in-place multipart upload component 108 of FIG. 1 to effectuate write-in-place multipart uploads.

In some examples, object_target_dir 1102 can be similar to object_target_dir 402 of FIG. 4, .parts_<uploadID> 1104 can be similar to .parts_<uploadID> 404, concat file 2N 1108 can be a file in which received parts having a size of 2N can be stored, data 1110 can be similar to data 410, and write-in-place multipart upload component 1112 can be similar to write-in-place multipart upload component 108 of FIG. 1. Part 1 1114 can be a part file similar to part 1 206-1 of FIG. 2, and data 1116 can be similar to data 308-1 of FIG. 3.

In some examples, for list parts operations, two lists are used. One list is a normal part file (such as part 1 1114), and the other list is of dot files (such as concat file 2N 1108). In some system architectures, the former list can be obtained with a command of, Traverse with StartAfter="0" (or a token that a client provided). The latter list can be obtained with a command of, TraverseOneDir with Prefix=".", and StartAfter="0.0". #length files can be filtered out because # is before "." or "0" in an American Standard Code for Information Interchange (ASCII) standard. A list parts operation can merge these two lists. Where a dot file and a normal part file for a part number both exist, a normal part file can be used. A length and etag value can be determined from the part file or the dot file.

Example Process Flows

FIG. 12 illustrates an example process flow 1200 for write-in-place multipart uploads, in accordance with an embodiment of this disclosure. In some examples, one or more embodiments of process flow 1200 can be implemented by write-in-place multipart upload component 108 of FIG. 1, or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1300 of FIG. 13, and/or process flow 1400 of FIG. 14.

Process flow 1200 begins with 1202, and moves to operation 1204. Operation 1204 depicts receiving a file in parts, the parts comprising a first part, a second part, and a third part. In some examples, this can comprise a multipart file upload as received by a server, such as server 106 of FIG. 1. In some examples, the first part, the second part, and the third part are received out of order relative to respective positions in the file. That is, there can be examples where the various parts of a multipart upload are received in any order.

After operation 1204, process flow 1200 moves to operation 1206.

Operation 1206 depicts, in response to receiving the first part, the first part having a first part number and a first value of a first length, writing the first part to a first temporary file that corresponds to the first value at a first location of the first temporary file based on the first part number. That is, a server can receive one part and store that part in a hash file based on the part's length, at an offset within that hash file based on its part number.

In some examples, operation 1206 comprises, after writing the first part to the first temporary file, determining a hash value for the first part, and writing the hash value to a third temporary file that corresponds to the first part number. That is, a dot file can be created that is unique to a respective part number, and a hash value (e.g., a MD5 value) can be written to the dot file.

In some examples, operation 1206 comprises writing the first value of the first length to the third temporary file. That is, a length of the part can also be written to the part's hash file.

In some examples, operation 1206 comprises responding to a request for an entity tag of the first part with the hash value from the third temporary file. That is, the hash value stored in a dot file can be used as an etag value in processing object storage operations.

In some examples the hash value is a first hash value, and operation 1206 comprises, after writing the second part to the second temporary file, determining a second hash value for the second part, and writing the second hash value to a fourth temporary file that corresponds to the second part number. That is, each part can have its own dot file.

In some examples, the first location is based on the first part number and the first value of the first length. That is, the offset within a hash file to write a part is determined based on the part number and the part length.

After operation 1206, process flow 1200 moves to operation 1208.

Operation 1208 depicts, in response to receiving the second part, the second part having a second part number and a second value of a second length, and in response to the second value equaling the first value, writing the second part to the first temporary file at a second location of the first temporary file based on the second part number. That is, the server can receive another part and store that part in a hash file based on the part's length, at an offset within that hash file based on its part number. Since both parts have a same length, they can be saved to the same hash file.

After operation 1208, process flow 1200 moves to operation 1210.

Operation 1210 depicts, in response to receiving the third part, the third part having a third part number and a third value of a third length of the third part, and in response to the third value differing from the first value, writing the third part to a second temporary file at a third location of the second temporary file based on the third part number. That is, the server can receive another part and save it to a different hash file because it has a different length than the two previously-received parts. This third file can be the last part in a series of parts.

After operation 1210, process flow 1200 moves to operation 1212.

Operation 1212 depicts, after receiving the first part, the second part, and the third part, writing data of the second temporary file to an end of the first temporary file. That is, once all parts are received, as part of a complete operation, the server can append data of the last part to the main hash file.

After operation 1212, process flow 1200 moves to operation 1214.

Operation 1214 changing a first name of the first temporary file to a second name of the file. That is, the server can rename the main hash file as the file name.

After operation 1214, process flow 1200 moves to 1216, where process flow 1200 ends.

FIG. 13 illustrates another example process flow 1300 for write-in-place multipart uploads, in accordance with an embodiment of this disclosure. In some examples, one or more embodiments of process flow 1300 can be implemented by write-in-place multipart upload component 108 of FIG. 1, or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 1200 of FIG. 12, and/or process flow 1400 of FIG. 14.

Process flow 1300 begins with 1302, and moves to operation 1304. Operation 1304 depicts storing a first group of the parts in a first file based on the parts of the first group of the parts sharing a first file length. In some examples, operation 1304 can be implemented in a similar manner as operation 1206 and operation 1208 of FIG. 12.

In some examples, respective part numbers of the parts are numbered sequentially. That is, there can be examples of write-in-place multipart uploads were there are no gaps in a sequence of part numbers at compete time.

After operation 1304, process flow 1300 moves to operation 1306.

Operation 1306 depicts storing a second part of the parts in a second file based on the second part having a second file length that differs from the first file length. In some examples, operation 1306 can be implemented in a similar manner as operation 1210 of FIG. 12.

In some examples, the second part is a last part of the file. In some examples, parts other than the second part share the first file length. That is, in some examples where write-in-place multipart uploads are implemented, all parts of a file are the same length, except for possibly the last part.

In some examples, operation 1306 comprises receiving, by the system and in response to a transmission failure, a retransmission of the second part comprising a retransmitted second part, wherein the second part and the retransmitted second part sharing the second file length. That is, in some examples, parts are only re-uploaded in the case of transmission failure, and the re-uploaded part will be the same size at the original.

In some examples, the appending of the data of the second file to the first file comprises the appending of the data of the second file to the first file in response to receiving an indication transmitting the parts is completed. That is, in some examples, the client explicitly completes the multipart upload, and that that triggers appending the last part to the rest of the parts in the accelerated path.

After operation 1306, process flow 1300 moves to operation 1308.

Operation 1308 depicts after receiving the parts, appending data of the second file to the first file. In some examples, operation 1308 can be implemented in a similar manner as operation 1212 of FIG. 12.

After operation 1308, process flow 1300 moves to operation 1310.

Operation 1310 depicts modifying a first name of the first file to a second name of the file. In some examples, operation 1310 can be implemented in a similar manner as operation 1214 of FIG. 12.

In some examples, operation 1310 comprises receiving second parts of a third file, and after receiving the second parts, and in response determining that there is a gap between respective part numbers of the second parts, that two parts of the second parts that are separate from a last part have different sizes, or that a size of at least one part of the second parts is zero, concatenating the second parts into a destination file. That is, where not all the conditions for the accelerated path are met, a fallback can be made to the default path for processing a multipart upload.

After operation 1310, process flow 1300 moves to 1312, where process flow 1300 ends.

FIG. 14 illustrates another example process flow 1400 for write-in-place multipart uploads, in accordance with an embodiment of this disclosure. In some examples, one or more embodiments of process flow 1400 can be implemented by write-in-place multipart upload component 108 of FIG. 1, or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of process flow 1200 of FIG. 12, and/or process flow 1300 of FIG. 13.

Process flow 1400 begins with 1402, and moves to operation 1404. Operation 1404 depicts receiving parts of a file. In some examples, operation 1404 can be implemented in a similar manner as operation 1204 of FIG. 12.

After operation 1404, process flow 1400 moves to operation 1406.

Operation 1406 depicts storing a first subset of the parts in a first file based on the parts of the first subset having a same size. In some examples, operation 1406 can be implemented in a similar manner as operation 1206 and operation 1208 of FIG. 12.

In some examples, operation 1406 comprises, after storing the first part in the first file, determining a hash value for the first part, and storing the hash value in a third file that corresponds to a part number of the first part.

In some examples the first subset of the parts comprises a first part, and operation 1406 comprises storing an indication of a length of the first part in the third file.

In some examples, operation 1406 comprises providing an entity tag of the first part based on the hash value. That is, dot files can be created for received part files, and information such as a hash for the part and a length of the part can be stored in the dot file.

After operation 1406, process flow 1400 moves to operation 1408.

Operation 1408 depicts storing a second part of the parts in a second file based on the second part having a different size from the first subset of the parts. In some examples, operation 1408 can be implemented in a similar manner as operation 1210 of FIG. 12.

After operation 1408, process flow 1400 moves to operation 1410.

Operation 1410 depicts after receiving the parts, appending data of the second file to the first file. In some examples, operation 1410 can be implemented in a similar manner as operation 1212 of FIG. 12.

After operation 1410, process flow 1400 moves to operation 1412.

Operation 1412 depicts altering a first name of the first file to a second name of the file. In some examples, operation 1412 can be implemented in a similar manner as operation 1214 of FIG. 12.

In some examples, operation 1412 comprises, in response to receiving second parts of a third file wherein a first part of the second parts is received first among the second parts, and in response to determining that the first part has a part number that is above a predetermined threshold number, storing each part of the second parts as a separate file and concatenating the respective parts upon completion of receiving the second parts. That is, there can be a case where a very high part number for a file is initially received, which would lead to creating a sparse file. In some examples, instead of creating a sparse part file, a fallback to the default path can be made.

In some examples, operation 1412 comprises receiving second parts of a third file, and in response to receiving a first part of the second parts, and in response to determining that an operation to create a fourth file that corresponds to a part number of the first part was unsuccessful, storing each part of the second parts as a separate file and concatenating the respective parts upon completion of receiving the second parts. That is, in examples where a dot file cannot be created for a part (e.g., because this is not the first time that this part number has been uploaded), a fallback to the default path can be made.

After operation 1412, process flow 1400 moves to 1414, where process flow 1400 ends.

Example Operating Environment

In order to provide additional context for various embodiments described herein, FIG. 15 and the following discussion are intended to provide a brief, general description of a suitable computing environment 1500 in which the various embodiments of the embodiment described herein can be implemented.

For example, parts of computing environment 1500 can be used to implement one or more embodiments of client computer 102 of FIG. 1 and/or server 106.

In some examples, computing environment 1500 can implement one or more embodiments of the process flows of FIGS. 12-14 to facilitate write-in-place multipart uploads.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a nonvolatile storage such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples, and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  receiving a file in parts, the parts comprising a first part, a second part, and a third part;
  in response to receiving the first part, the first part having a first part number and a first value of a first length, writing the first part to a first temporary file that corresponds to the first value at a first location of the first temporary file based on the first part number;
  in response to receiving the second part, the second part having a second part number and a second value of a second length, and in response to the second value equaling the first value, writing the second part to the first temporary file at a second location of the first temporary file based on the second part number;
  in response to receiving the third part, the third part having a third part number and a third value of a third length of the third part, and in response to the third value differing from the first value, writing the third part to a second temporary file at a third location of the second temporary file based on the third part number;

after receiving the first part, the second part, and the third part, writing data of the second temporary file to an end of the first temporary file; and changing a first name of the first temporary file to a second name of the file.

2. The system of claim 1, wherein the first part, the second part, and the third part are received out of order relative to respective positions in the file.

3. The system of claim 1, wherein the operations further comprise:

after writing the first part to the first temporary file, determining a hash value for the first part; and writing the hash value to a third temporary file that corresponds to the first part number.

4. The system of claim 3, wherein the operations further comprise:

writing the first value of the first length to the third temporary file.

5. The system of claim 3, wherein the operations further comprise:

responding to a request for an entity tag of the first part with the hash value from the third temporary file.

6. The system of claim 3, wherein the hash value is a first hash value, and wherein the operations further comprise:

after writing the second part to the second temporary file, determining a second hash value for the second part; and writing the second hash value to a fourth temporary file that corresponds to the second part number.

7. The system of claim 1, wherein the first location is based on the first part number and the first value of the first length.

8. A method, comprising:

receiving, by a system comprising a processor, a file in parts, the parts comprising a first part, a second part, and a third part;

in response to receiving the first part, the first part having a first part number and a first value of a first length, writing, by the system, the first part to a first temporary file that corresponds to the first value at a first location of the first temporary file based on the first part number;

in response to receiving the second part, the second part having a second part number and a second value of a second length, and in response to the second value equaling the first value, writing, by the system, the second part to the first temporary file at a second location of the first temporary file based on the second part number;

in response to receiving the third part, the third part having a third part number and a third value of a third length of the third part, and in response to the third value differing from the first value, writing, by the system, the third part to a second temporary file at a third location of the second temporary file based on the third part number;

after receiving the first part, the second part, and the third part, writing, by the system, data of the second temporary file to an end of the first temporary file; and changing, by the system, a first name of the first temporary file to a second name of the file.

9. The method of claim 8, wherein the second part is a last part of the file.

10. The method of claim 9, wherein parts of the parts other than the second part share the first length.

11. The method of claim 8, wherein respective part numbers of the parts are numbered sequentially.

12. The method of claim 8, further comprising:

receiving, by the system and in response to a transmission failure, a retransmission of the second part comprising a retransmitted second part, wherein the second part and the retransmitted second part sharing the second length.

13. The method of claim 8, further comprising:

receiving, by the system, second parts of a third file;

after receiving the second parts, and in response determining that there is a gap between respective part numbers of the second parts, that two parts of the second parts that are separate from a last part have different sizes, or that a size of at least one part of the second parts is zero, concatenating, by the system, the second parts into a destination file.

14. The method of claim 8, wherein the writing of the data of the second temporary file to the end of the first temporary file appending of the data of the second file to the first file comprises the writing of the data of the second temporary file to the end of the first temporary file appending of the data of the second file to the first file in response to receiving an indication transmitting the parts is completed.

15. A non-transitory computer-readable medium comprising instructions that, in response to execution, cause a system comprising a processor to perform operations, comprising:

receiving a file in parts, the parts, comprising a first part, a second part, and a third part;

in response to receiving the first part, the first part having a first part number and a first value of a first length, writing the first part to a first temporary file that corresponds to the first value at a first location of the first temporary file based on the first part number;

in response to receiving the second part, the second part having a second part number and a second value of a second length, and in response to the second value equaling the first value, writing the second part to the first temporary file at a second location of the first temporary file based on the second part number;

in response to receiving the third part, the third part having a third part number and a third value of a third length of the third part, and in response to the third value differing from the first value, writing the third part to a second temporary file at a third location of the second temporary file based on the third part number;

after receiving the first part, the second part, and the third part, writing data of the second temporary file to an end of the first temporary file; and changing a first name of the first temporary file to a second name of the file.

16. The non-transitory computer-readable medium of claim 15, wherein the operations further comprise:

in response to receiving second parts of a third file wherein a fourth part of the second parts is received first among the second parts, and in response to determining that the fourth part has a part number that is above a predetermined threshold number, storing each part of the second parts as a separate file and concatenating the respective parts of the second parts upon completion of receiving the second parts.

17. The non-transitory computer-readable medium of claim 15, wherein the operations further comprise:
   receiving second parts of a third file; and
   in response to receiving a fourth part of the second parts, and in response to determining that an operation to create a fourth file that corresponds to a part number of the fourth part was unsuccessful, storing each part of the second parts as a separate file and concatenating the respective parts of the second parts upon completion of receiving the second parts.

18. The non-transitory computer-readable medium of claim 15, wherein the operations further comprise:
   after writing the first part to a first temporary file, determining a hash value for the first part; and
   storing the hash value in a third file that corresponds to the first part number.

19. The non-transitory computer-readable medium of claim 18, wherein the operations further comprise:
   storing an indication of a length of the first part in the third file.

20. The non-transitory computer-readable medium of claim 18, wherein the operations further comprise:
   providing an entity tag of the first part based on the hash value.

* * * * *